US008560602B2

(12) United States Patent
Andrade et al.

(10) Patent No.: US 8,560,602 B2
(45) Date of Patent: *Oct. 15, 2013

(54) DATA SHARING IN A STREAM PROCESSING SYSTEM

(75) Inventors: Henrique Andrade, Croton-on-Hudson, NY (US); Bugra Gedik, White Plains, NY (US); Martin J. Hirzel, White Plains, NY (US); Vibhore Kumar, Stamford, CT (US); Giuliano Losa, Lausanne (CH); Robert J. Soule, Brooklyn, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,371

(22) Filed: Sep. 10, 2012

(65) Prior Publication Data

US 2013/0018943 A1    Jan. 17, 2013

Related U.S. Application Data

(63) Continuation of application No. 12/791,484, filed on Jun. 1, 2010, now Pat. No. 8,285,780.

(51) Int. Cl.
G06F 15/16 (2006.01)
(52) U.S. Cl.
USPC ............................ 709/203; 709/201; 709/202

(58) Field of Classification Search
USPC .................................................. 709/201–203
See application file for complete search history.

(56) References Cited

U.S. PATENT DOCUMENTS

| 7,761,677 | B2 * | 7/2010 | Arakawa et al. ............... 711/165 |
| 2011/0225584 | A1 * | 9/2011 | Andrade et al. ............... 718/100 |
| 2011/0295939 | A1 | 12/2011 | Andrade et al. |

OTHER PUBLICATIONS

Gedik, et al., "SPADE: System S Declarative Stream Processing Engine," SIGMOD, Jun. 9-12, 2008, pp. 1123-1134.
Rea, Roger et al., "IBM InfoSphere Streams, Redefining Real Time Analytics", published Feb. 2010.
Hirzel et al., "SPL Stream Processing Language Specification", IBM Research Report, RC24897 (W0911-044), Nov. 5, 2009.

* cited by examiner

*Primary Examiner* — Mohamed Wasel
(74) *Attorney, Agent, or Firm* — William Stock, Esq.; Blanche E. Schiller, Esq.; Heslin Rothenberg Farley & Mesiti P.C.

(57) ABSTRACT

Data sharing is facilitated in stream processing environments, including distributed stream processing environments. A processor of the stream processing environment obtains at least one of usage information for shared data of the stream processing environment, one or more pre-declared characteristics of the shared data, or performance information relating to the stream processing environment. Based on at least one of the usage information, the one or more pre-declared characteristics or the performance information, code is generated for managing the shared data.

20 Claims, 7 Drawing Sheets

DATA SHARING IN A STREAM PROCESSING SYSTEM

This application is a continuation of co-pending U.S. Ser. No. 12/791,484, entitled "STATE SHARING IN A DISTRIBUTED DATA STREAM PROCESSING SYSTEM," filed Jun. 1, 2010, (U.S. Publication No. 2011/0295939, published Dec. 1, 2011), which is hereby incorporated herein by reference in its entirety.

This invention was made with Government support under Contract No.: H98230-07-C-0383 awarded by Intelligence Agencys. The Government has certain rights in this invention.

BACKGROUND

This invention relates, in general, to stream processing, and in particular, to facilitating state sharing in stream processing environments, including distributed stream processing environments.

Processing within a data processing system can include various computational paradigms, including non-stream processing and stream processing. In non-stream processing, data is typically received, stored in memory or elsewhere and later processed. In contrast, in stream processing, data is processed as it is continuously received.

Examples of stream processing systems include large scale sense-and-respond systems, which continuously receive external signals in the form of one or more streams from one or more sources and employ analytics aimed at detecting critical conditions and, ideally, responding in a proactive fashion. Examples of such systems range from systems deployed for monitoring and controlling manufacturing processes, power distribution systems, and telecommunication networks, to environmental monitoring systems, to algorithmic trading platforms, etc.

Stream processing environments run stream processing applications, and those applications access data, such as state (e.g., application specific data structures whose contents are to be maintained and manipulated for a period of time). That data may, in certain situations, be shared between applications or even between components of one application.

BRIEF SUMMARY

In accordance with an aspect of the present invention, a capability is provided for sharing state in stream processing environments, including distributed stream processing environments.

The shortcomings of the prior art are overcome and additional advantages are provided through the provision of a method of sharing data in a stream processing environment. The method includes, for instance, obtaining, by a processor of the stream processing environment, at least one of usage information for shared data of the stream processing environment, one or more pre-declared characteristics of the shared data, or performance information relating to the stream processing environment; and generating, by the processor based on at least one of the usage information, the one or more pre-declared characteristics or the performance information, code for managing the shared data.

System and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for facilitating state sharing in stream processing environments, including distributed stream processing environments. Stream processing environments run stream processing applications. A stream processing application includes one or more, and typically many, operators. An operator is, for instance, software that executes on a processor to perform a particular function, including, but not limited to, arithmetic functions, and providing an output stream to another operator, etc. Operators in a stream processing application access data that may need to be shared with other operators or with other components in the system. Such operators include, for instance, operators that frequently update and access a common set of rules that are used for processing incoming data tuples, or a group of filter operators that access a certain externally modifiable threshold variable which determines the data tuples that need to be dropped. This sharing of data is to be accomplished while satisfying performance and latency expectations of stream processing applications. An example of this shared data is shared state, which is implemented as a simple or complex data structure.

In accordance with an aspect of the present invention, highly customized code for representing the shared state (i.e., the data structure) and for managing and/or manipulating the shared state (i.e., the specific methods that can be used to read, update or operate on the shared state) is generated based on user specified preferences and/or hints to the compiler, which may then be used in conjunction with runtime information. The runtime information relates to underlying system resources and to performance of various shared state implementations under varying system configurations and conditions. The customizations can relate to the consistency model to be utilized (i.e., when to notify other operators or external applications, which use/manipulate the same shared state, of updates); the consistency protocol mechanism, which implements the policies used by the consistency model and that governs the interaction between client-server and/or between replicated servers of the same shared state; the transport mechanism used to transmit messages from one machine to another; a caching mechanism that indicates, for example, whether or not to cache, as well as when to refresh the cached values and propagate updates, etc.

For instance, provisions have been made in a language used to create stream processing applications in which a user can specify preferences and usage specific hints, like the expected number of read operations per second, the expected number of write operations per second, the expected size of the shared state data structure (in case of dynamic data structures), the expected number of clients, etc. for each implementation of state that is declared to be shared. In the language, the shared state is referred to as a shared variable, which looks like any other variable in a computer language. The shared variable is implemented, for instance, as a data structure, as described in further detail herein.

Moreover, in one embodiment, runtime entities (e.g., profilers) are provided that collect information about the runtime and the performance of one or more of different consistency model implementations, consistency protocol implementations, transport implementations, etc. on the underlying cluster for a range of configurations. Each configuration includes, for instance, a selected consistency model, a consistency protocol implementation, a transport implementation, and/or a caching mechanism, as examples. This information is then used to create a customized shared state implementation, such as a customized data structure, that represents the shared state and is embodied in the streaming application as, for instance, a variable.

There are many functions that require or desire sharing data across operators, and across operators and the runtime. These functions include updating control variables, sending notifications, collecting metrics, building classification/predictive models, etc. A stream processing application may be distributed in that operators of the application execute on different processors and/or the data (e.g., state) to be shared resides on a processor (or address space) different from the one executing an operator accessing/manipulating the data.

Figure 1A:
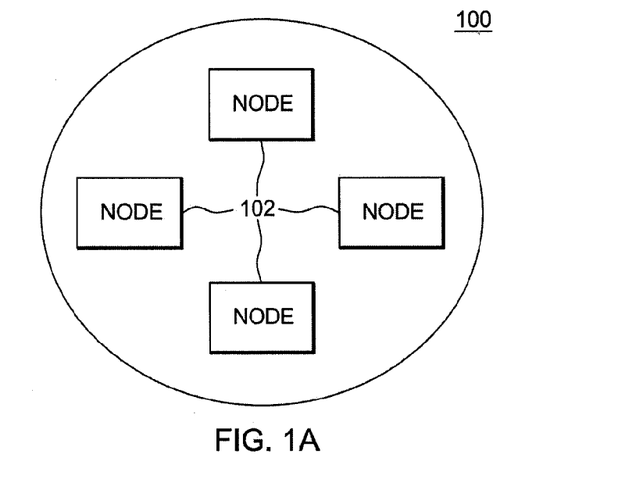
FIG. 1A depicts one embodiment of a computing environment to incorporate and use one or more aspects of the present invention.

One embodiment of a computing environment to incorporate and use one or more aspects of the present invention is described with reference to FIGS. 1A-1B. As shown in FIG. 1A, a computing environment 100 includes, for instance, a plurality of nodes 102 coupled to one another via one or more connections, including, but not limited to, a local area network or a wide area network, such as the internet. As examples, node 102 may be a System x®, System p® or System z® server offered by International Business Machines Corporation. The nodes of the computing environment may be the same or different from one another. System x®, System p®, System z®, and IBM® are registered trademarks of International Business Machines Corporation, Armonk, N.Y. Other names used herein may be registered trademarks, trademarks or product names of International Business Machines Corporation or other companies.

Figure 1B:
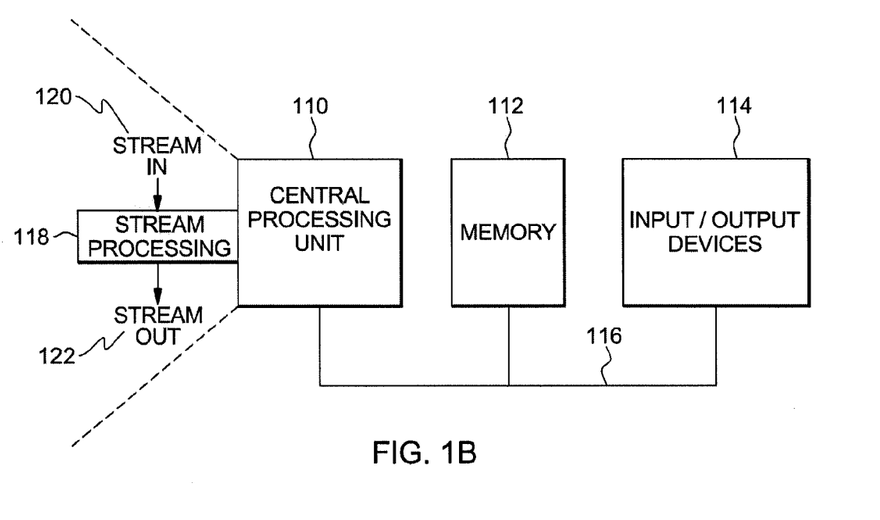
FIG. 1B depicts further details of a node of FIG. 1A, in accordance with an aspect of the present invention.

Referring to FIG. 1B, a node 102 includes, for instance, one or more processors (e.g., central processing units) 110, a memory 112, and one or more input/output devices 114 coupled to one another via, for instance, one or more buses 116. As one example, processor 110 may be an x86 processor offered by Intel® Corporation, Santa Clara, Calif., or other processors. Processor 110 may execute an operating system (e.g., z/OS® offered by International Business Machines Corporation), as well as applications or logic to perform one or more tasks. z/OS® is a registered trademark of International Business Machines Corporation, Armonk, N.Y., U.S.A,; and Intel® is a registered trademark of Intel Corporation, Santa Clara, Calif., U.S.A.

In one example, processor 110 executes stream processing logic 118, which may be comprised of a group of operators, each of which may be software that executes on a processor, such as processor 110, to perform one or more functions. As shown, an input stream of events 120 may be provided to stream processing logic 118, which may output a stream of events 122.

In this example, the computing environment is capable of executing a real-time stream processing platform, such as InfoSphere Streams™ (previously known as System S), offered by International Business Machines Corporation, Armonk, N.Y. Details regarding InfoSphere Streams™ are provided in various IBM® publications including, for example, a publication entitled "IBM InfoSphere Streams, Redefining Real Time Analytics," by Roger Rea and Krishna Mamidipaka, published February, 2010. The InfoSphere Streams™ platform uses a high-level programming language referred to as the Stream Processing Language (SPL; formerly known as SPADE). SPADE is described in "SPADE: System S Declarative Stream Processing Engine," Gedik et al., SIGMOD, Jun. 9-12, 2008, pp. 1123-1134. Further details regarding SPL are described in an IBM® Research Report entitled "SPL Stream Processing Language Specification," Hirzel et al., RC24897 (W0911-044), Nov. 5, 2009.

InfoSphere Streams™ and the Stream Processing Language support structured and unstructured distributed data stream processing applications that can span a large number of computing nodes. The InfoSphere Streams™ middleware can execute a large number of long-running stream processing applications. Applications can interact as part of a single application or a set of related applications possibly taking the form of complex data-flow graphs. A data-flow graph includes a set of processing elements (e.g., InfoSphere Streams™ runtime execution units) connected by data streams, in which each data stream carries a series of tuples. The processing elements are containers that host components (e.g., Stream Processing Language operators) that implement data stream analytics and can be distributed on multiple computing nodes. The computing nodes can be organized as a shared-nothing cluster of workstations or as a large supercomputer, as examples. The processing elements communicate with each other via their input and output ports, which are connected by the data streams. The processing element ports, as well as the data streams, are strongly typed, employing an application-defined type system, which is typically built by combining Info Sphere Streams™ supported basic types that range from numeric types, such as eight-bit integers, to complex types, such as lists of basic type elements.

The Stream Processing Language declarative language is used, in one example, to program these multi-operator applications. The language provides a rapid application development front-end that includes a plurality of features. One of these features is a language for flexible composition of parallel and distributed data-flow graphs. This language can be used directly by programmers, or can be used between task-specific higher level programming tools (e.g., for querying, composition of map-reduce flows, or the like) and lower-level application programming interfaces (APIs). Another feature of the Stream Processing Language declarative language is extensibility based on support for adding new toolkits of type-generic stream processing operators. Further, the Stream Processing Language declarative language includes a broad range of edge adapters that are used to ingest data from external sources and to publish results to external consumers (e.g., network sockets, databases, file systems, proprietary platforms, and the like).

Stream Processing Language's stream-centric design implies a language where the basic building block is a stream. In other words, an application writer can quickly translate the flows of data from a block diagram into the application source code by listing the stream flows and stating which operator (e.g., component) generates a data stream.

Stream Processing Language's operator-based programming is focused on designing the application around the smallest possible building blocks necessary to deliver the computation an application is designed to perform. This building block processing logic defined by an operator might make use of other assets, such as libraries and hardware resources, such as a particular physical I/O device.

Figure 2A:
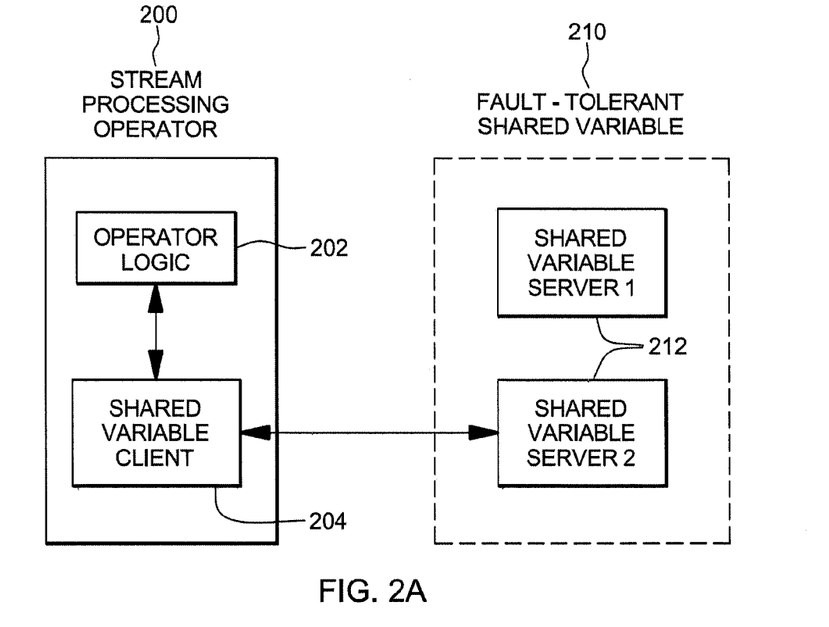
FIG. 2A depicts one embodiment of a stream processing operator accessing a shared variable, in accordance with an aspect of the present invention.

One example of an operator is depicted in FIG. 2A. In this example, a stream processing operator 200 includes, for instance, operator logic 202 to operate on (e.g., update or read) a shared variable client 204, which is used as an interface to a shared variable 210. Shared variable 210 can be implemented by one or more shared variable servers 212. A shared variable server is responsible for implementing the shared variable. For instance, if the shared variable is an integer, the server allocates space for the integer and implements the operations that can be performed on an integer value via, for instance, methods (adding, subtracting, multiplying, dividing, comparing, reading, updating, among others). Although the shared variable client is shown as part of the operator, a shared data structure that implements the shared variable includes the shared variable server(s), as well as the shared variable client, and a description file that describes the server(s), as further described herein.

Figure 2B:
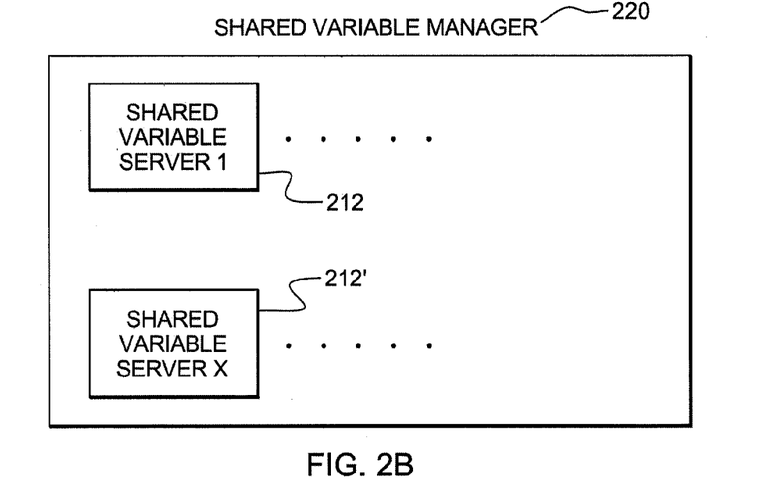
FIG. 2B depicts one example of a shared variable manager hosting shared variable servers of shared variables, in accordance with an aspect of the present invention.

As shown in FIG. 2B, shared variables and the servers that support them are hosted by shared variable managers. In the example depicted in FIG. 2B, a shared variable manager 220 hosts a plurality of shared variables, including shared variable server 1 (212) and shared variable server X (212'). A shared variable manager can host multiple shared variable servers that belong to different shared variables, as depicted herein. For instance, shared variable server 1 (212) belongs to a shared variable A and shared variable server X (212') belongs to a shared variable B. A single shared variable can have multiple shared variable servers hosted across multiple shared variable managers. However, in one embodiment, there is one shared variable manager per node.

Figure 2C:
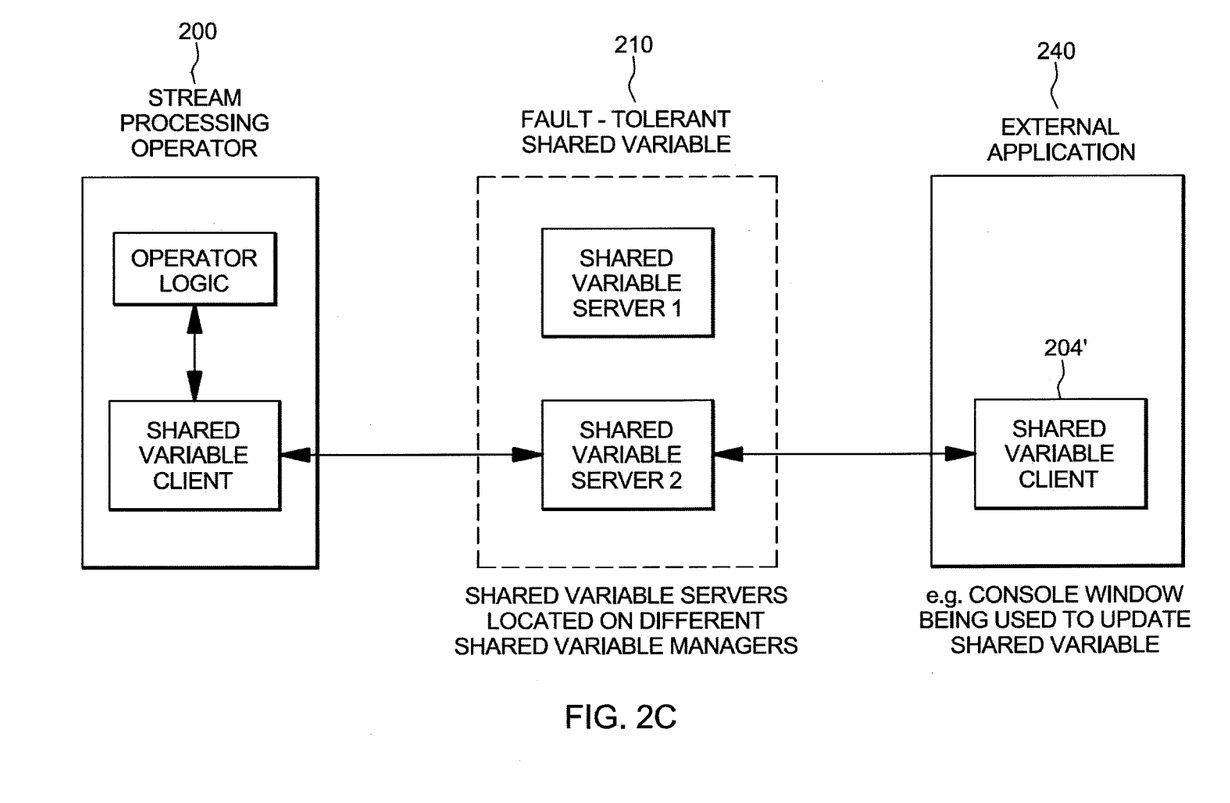
FIG. 2C depicts one embodiment of an external application accessing a shared variable, in accordance with an aspect of the present invention.

A shared variable can also be accessed by one or more external applications, as depicted in FIG. 2C. As shown in FIG. 2C, an external application 240 also includes a shared variable client 204' which is used to facilitate access to shared variable 210.

In one example, a shared variable is a primitive type variable. In other examples, however, it can be a variable of a complex type, including a structure with arbitrary nesting, as well as with attributes that store collections of values, such as lists, maps, sets of potentially complex objects, etc. By encapsulating the shared variable on a server, operators of the same application, as well as other operators, have access to that state and are able to share it. In one example, an operator performs a function (e.g., increment) on a shared variable (e.g., threshold), and the result may be provided to the client invoking the function.

Figure 3:
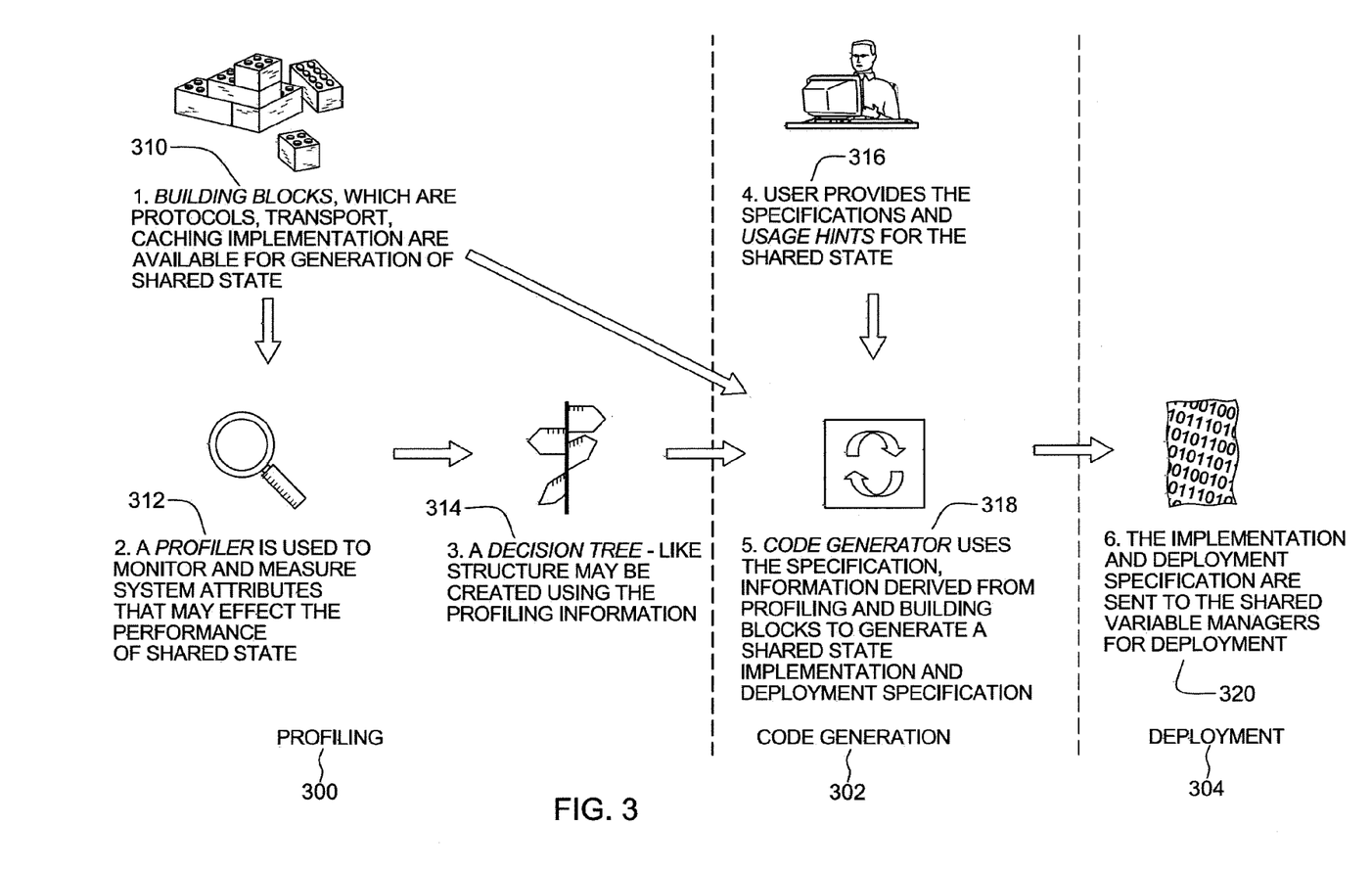
FIG. 3 depicts one embodiment of the logic to generate and deploy shared variables, in accordance with an aspect of the present invention.

One embodiment of the logic to build and deploy a shared variable is described with reference to FIG. 3. In this embodiment, the shared variable is implemented as a data structure, which includes, for instance, a shared variable client stub used to invoke a function to access the shared variable; one or more servers that maintain the shared variable; and a specification file that describes the servers. Other embodiments, however, may include other implementations, including other types of data structures, as well as other client/server layouts and organizations. Further, in other embodiments, the shared state is represented as a component other than a shared variable.

To build and deploy the shared data structure, in one example, there are three stages, including profiling 300 (which is optional, in one embodiment), code generation 302 and deployment 304. During the profiling stage, information used to create the data structure, as well as information describing how to use the shared variable implemented by the data structure, is obtained. For instance, building blocks 310 that are available for generation of the data structure are selected. These building blocks include, for instance, a consistency protocol implementation; a transport implementation; a caching mechanism; and/or certain primitive data type implementations. These building blocks can be combined to form the client side stub and the one or more servers for the distributed shared variable.

The building blocks are provided to a profiler 312, which is used to monitor and measure system attributes that may affect the performance of the shared variable. In one example, the profiler obtains information on the use of a shared variable and employs that to model the performance of shared state implementations under different system configurations and conditions. For example, based on the information collected by the profiler, the SPL compiler might employ the following configuration for a particular shared variable: SharedState [NoCaching, AtomicProtocol, CORBATransport] (NoCaching is the caching mechanism; AtomicProtocol is the consistency protocol; CORBATransport is the transport protocol), for the following usage scenarios (these are potential metrics whose values are collected during the profiling phase):
Different Read/Write Ratios;
Different Number of Replicas; and/or
Different Number of Clients.

The profiling information obtained is used, in one example, to create a decision tree-like structure 314. The tree-like structure (or profiling information otherwise provided) and the selected building blocks are provided to the code generation stage 302 and carried out during the application compilation by the SPL compiler.

In the code generation stage, a user 316 provides various specifications and usage hints for the shared state to a code generator 318 executing on a processor of one of the nodes. As examples, the profiling information and usage hints are used in conjunction or in isolation. These usage hints include, for instance, the expected number of read operations per second, the expected number of write operations per second; the expected size of the shared state; the expected number of clients making use of the shared state, etc. The code generator then uses the specifications and/or hints, the information derived from profiling, and/or the building blocks to generate a shared state implementation (e.g., data structure), including a deployment specification that provides information about the servers (e.g., location, number of servers—for fault tolerance, partitioning). At least part of the shared state implementation is realized as customized code. The code generator makes use of an automated inference mechanism, in one example, to generate customized code that is most suited to instantiation of the specific shared variable.

The implementation, including the deployment specification, is then made available to deployment stage 304 as part of the application launching process, in which one or more shared variable managers 320 are used to deploy the server-side of the shared variable. For instance, the server (e.g., dynamic link libraries encapsulating the server) and deployment specification are submitted (e.g., via a user or program running on a processor) to one or more shared variable managers running on one or more nodes of the stream processing environment. The one or more shared variable managers load and initialize the shared variable servers with the one or more parameters from the deployment specification. Then, when the shared variable has been loaded, the clients can interact with it using the client generated stubs.

As indicated above, the generated customized code includes, for instance, shared variable servers, a deployment specification file, and client side stubs (a.k.a., shared variable clients). The generated servers are entities that are instantiated in the context of runtime entities called shared variable managers. The servers manage the interaction with clients and other servers and may have provision for locally storing a partial or a complete data structure. In one example, the shared variable servers are compiled into DLLs (dynamic link libraries), and encapsulate a server-side transport and protocol object, and a data object that is either compiled into the shared variable server or is a reference to a data object that is remote, as further described below. To enable remote access and composability, the shared variable exports a remotely accessible data object interface.

The placement of these servers and information about the protocol specific grouping and composition is included, for instance, in a deployment specification file, referred to herein as a Shared Variable Description Language (SVDL) file. The SVDL file includes references to the shared variable name, expresses its composition and also includes the location where the shared variable server DLLs will be loaded at runtime. One example of a deployment description file, which shows the servers that constitute the shared variable "A" is depicted below:

```
<sharedState>
    <name>A</name>
    <serverGroup>
        <protocol>Atomic</protocol>
        <baseVariable>
            <dll>/users/omega/abc.so</dll>
            <location>node-b</location>
        </baseVariable>
        <baseVariable>
            <dll>/users/omega/abv.so</dll>
            <location>node-b</location>
        </baseVariable>
    </serverGroup>
</sharedState>
```

In the above example, in which the consistency protocol is referred to in an XML excerpt, the two servers are copies of each other and are related to each other using an "atomic" consistency protocol, in which both servers are atomically updated. The file specifies the location of the two servers.

The generated client-side stubs can be used by operators and/or external programs to access the shared state. The shared client-side stubs expose an access interface that is the same as for regular SPL data types. The stubs, besides the interface code, also include a client-side transport and protocol object, and may also contain a caching object, as further described below.

Figure 4A:
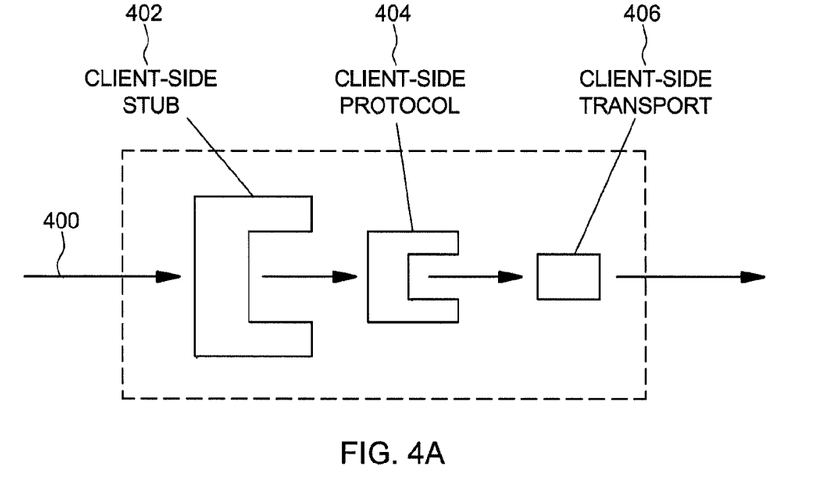
FIG. 4A depicts one embodiment of various components of a shared variable client, in accordance with an aspect of the present invention.

Referring to FIG. 4A, in one example, an operator utilizes a shared variable that is of a regular SPL data type and resembles a regular program variable, including in how it is actually used (e.g., ++i, a pre-increment operation on i) 400. The client-side stub 402 serializes the parameter (in this case, the current value of i) and translates the operation to an invoke call on the client-side transport 406 (e.g., Bufferparams output; params <<1; stub→invoke (add, params, output);). The client-side protocol 404 decides, for instance, whether to perform the operation on the cache, if one exists, or forwards the call to the shared variable server by making use of the transport mechanism 406. The client-side transport 406, if needed, marshals the data to transport a specific format and makes a remote call to the transport server (e.g., remote→invoke ([add], [params], [output], [exception]);).

Figure 4B:
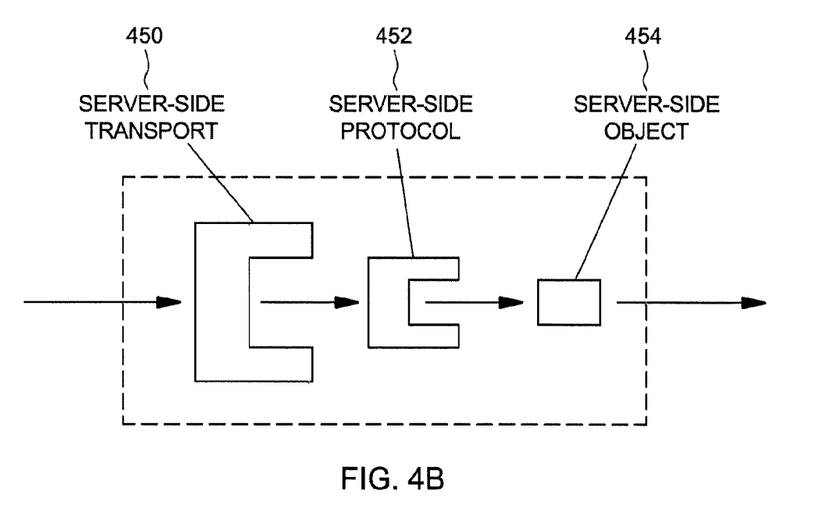
FIG. 4B depicts one embodiment of various components of a shared variable server, in accordance with an aspect of the present invention.

Referring to FIG. 4B, a server-side transport interface 450 receives a call from the client-side transport mechanism. The server-side transport mechanism makes use of the server-side protocol 452. The server-side protocol, for instance, invokes a forwarding of the call to another shared variable server, besides forwarding it to the contained data object. The server-side object 454 translates the incoming call and operation on the contained data after de-serializing the incoming data and sends back the serialized output, if any. Depending on the specific consistency protocol for this shared variable, locking and pushing the new value out to other operators and external applications using the shared variable might occur.

Further details regarding creating and using shared variables are described with reference to FIG. 5. Initially, a Stream Processing Language (SPL) developer 500 creates an SPL program 502. In this example, the program declares one or more variables to be shared. One example of the syntax for a shared variable declaration in SPL is as follows:

| | |
|---|---|
| sharedVarDef | ::= sharedVarModifier* type ID ( '=' expr )? sharedVarConfigs |
| sharedVarModifier | ::= 'public' \| 'static' \| 'mutable' |
| sharedVarConfigs | ::= ';' \| '{' 'config' configuration+'}' |
| config | ::= ID ':' expr ':' |

A shared variable, besides the type declaration is qualified by modifiers and configurations (configs). In this one embodiment, modifiers specify a particular behavior that is enforced in the language, whereas configs are passed to the underlying implementation, which has the freedom to decide what to do with them. In one embodiment, there are, for instance, three possible modifiers. They specify how to instantiate a shared variable (static keyword), its visibility to other operators and applications (public keyword), and if it is mutable or immutable (mutable keyword). The static modifier specifies that all instances of the operator defining a variable will share the same copy. Without this modifier, every operator instance will have its own copy of the variable. The public modifier affects the visibility of the shared variable. By default (without the public modifier), a shared variable is visible only in the operator in which it is declared. If the public modifier is used, the shared variable will be visible in the whole system. This means that it can be referred to anywhere in the same application or in another application running in the InfoSphere Streams™ instance. Static variables can be declared public, and they can be accessed by providing their name, the name of the operator defining them and the SPL namespace of the application. The mutable modifier allows a shared variable to be modified; by default, it is read-only. Shared variables optionally have an initializer. If they are read-only, the initializer is present, in this example. The SPL compiler statically enforces the restrictions specified by the modifiers by generating the necessary code to carry out the enforcement of these restrictions.

Once declared, a shared variable can be used as any other SPL variable, except for the restrictions specified by the modifiers specified by the application developer. An example declaration of a shared variable is included in the following code:

```
composite CompositeWithSharedVariable(output Out; input In) {
    var   int32 s_thresh = 10;
        public static mutable map<string, int32> s_m {
            config    lifetime         : eternal;
                      consistency      : volatile;
                      sizeHint         : 16 * 1024 * 1024 * 1024;
                                       // 16 GB
                      writesPerSecond  : 5;
                      readsPerSecond   : 500;
        }
    graph stream<In> Tmp = Classifier(In) { param usingMap : s_m; }
          stream<In> Out = Functor(Tmp) { param filter : x > s_thresh; }
}
```

In the above example, the shared variable s_thresh is declared to be of type int32 (i.e., a 32-bit integer value), but has no specific configurations, and therefore, the code generator will use default configurations. On the other hand, the shared variable s_m is declared to be of type map and has a configuration (in SPL, the keyword config is used as a clause to demarcate a set of configurations) associated with it. For instance, it specifies: lifetime consistency, sizeHint, writesPerSecond, and readsPerSecond. In this example, the sizeHint configuration, which specifies the expected size of a dynamic variable, is set to 16 GB in this case. To accomplish such a large size, the code generator, based on information supplied by the profiler, may decide to generate a partitioned implementation of the variable to achieve high performance.

Figure 5:
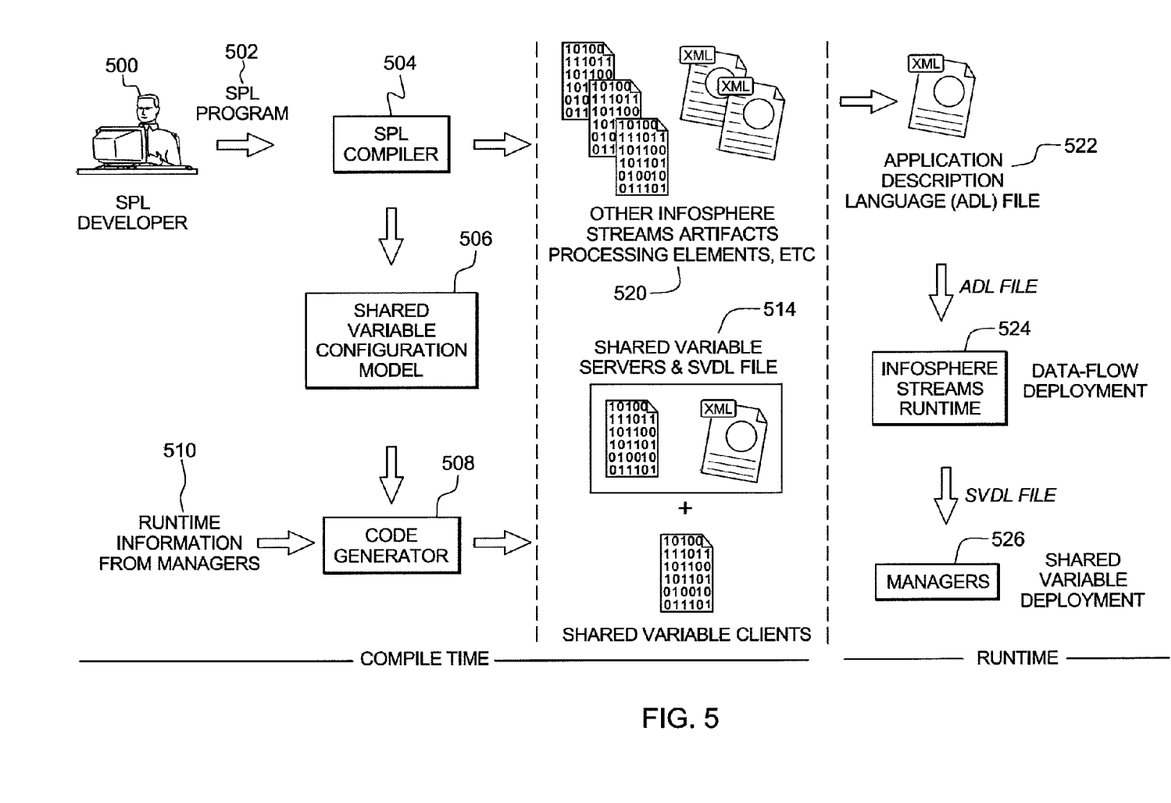
FIG. 5 depicts further details of one embodiment of the logic to generate and deploy shared variables, in accordance with an aspect of the present invention.

Continuing with reference to FIG. 5, in one embodiment, the SPL program is input to an SPL compiler 504 executing on a node. As the SPL compiler analyzes the application, it locates the variables that are to be shared and creates a model that describes the shared variables. This model, referred to herein as the shared variable configuration model 506, describes certain properties about the variable. It captures not only the data structure it is to represent, but also properties of how that variable is to be utilized by operators and external applications.

As indicated above, various configuration parameters are supported. For example, the following configuration parameters may be specified for any given shared variable:
  consistency: [volatile or write-through or managed]
  redundancy: [false or true]
  lifetime: [automatic or eternal]
The default values for the configurations are, for instance, volatile, false and automatic, respectively.

The consistency configuration, in one embodiment, could be used by the user to specify the consistency protocol that governs the interaction between the one or more shared variable clients and the shared variable server. For instance, when using the volatile consistency model, all operations (read or write) on the shared variable involve an interaction with the shared variable server. When using the write-through consistency model, the shared variable client maintains a cached value of the shared variable and any read operations are served locally using the cache content, while any write operation updates the local cache, as well as the shared variable server and all other client caches. When using the managed consistency model, the shared variable client maintains a cached value of the shared variable and read operations are served locally; the write operations can only be performed when the client in question has acquired a unique lock from the shared variable server. The lock acquisition causes the local client cache to be updated with the latest value from the server and the lock release causes the server to be updated with the latest value from the client.

The volatile setting can be used by applications that need to read the most recent value of the shared variable for consistency reasons. The write-through setting can be used in scenarios where the shared variable is updated only by a small number of clients, but is read by several other clients, and a small delay in propagation of updates to the clients is acceptable. The managed setting can be used to implement an application specific consistency model and to limit the number of accesses to the shared variable server.

The redundancy configuration is set to false by default. This configuration, when set to true, causes the system to instantiate two or more logical copies of the shared variable server. This facilitates recovery from a failure, but might degrade the overall performance of the shared variable.

The lifetime is set to automatic by default. When using automatic as the value for lifetime, a shared variable server is garbage collected when the number of applications referencing the variable reduces to 0. The eternal value may be used for "public static" shared variables and this causes the shared variable server to not be garbage collected, even when the number of applications referencing the variable reduces to 0. Eternal shared variables are shutdown manually through their appropriate server interface.

One can specify the above configurations for any shared variable and different configuration choices may lead to different code being generated for the shared variable client, server or the deployment specification, according to an aspect of the present invention.

For instance, the following two declarations will lead to different code being generated for the shared variable client and server:

```
public static mutable int32 s_a
{
    config
        consistency: volatile;
}
public static mutable int32 s_a
{
    config
        consistency: writeThrough;
}
```

The implementation of the client and server side consistency protocol will also be different for the two shared variables declared below:

```
public static mutable int32 s_a
{
  config
      redundancy: false;
}
public static mutable int32 s_a
{
  config
      redundancy: true;
}
```

In the above example, the implementation of the shared variable server (because of the desire to maintain consistency between redundant shared variable server copies) and the deployment specification (because of the desire to specify the redundant shared variable server) will be different for the two shared variables declared above.

Continuing with FIG. 5, the shared variable configuration model 506 is input to a code generator 508. This code generator, which is part of, for instance, the SPL compiler, produces the client-side and server-side for managing that variable. According to an aspect of the present invention, the code generator obtains the shared variable configuration model, as well as runtime information 510 from the shared variable managers. The code generator might make use of the shared variable server, the Shared Variable Description Language specification, and the shared variable client 514, as described herein.

In one example, the code generator relies on a set of objects, that it composes together, to generate the shared variable servers and the shared variable client stubs. The design for these generated artifacts segregates the functionality into, for instance, four main objects: the data object, the consistency protocol object, the transport object and the cache mechanism object; and a defined interaction interface—the invoke method that enables the composition of these objects. For instance, the code generator can generate a shared variable server for a 32-bit integer value (or, in the SPL language, an int32 value) that is encapsulated in a data object, with a consistency protocol object that enforces atomic consistency between the replicas of this data object, and using a CORBA-based transport object. The design provides the capability to choose an implementation of the object that is suitable for a specific usage scenario (i.e., suitable to how the user is planning to use the shared variable). Further, in one example, a shared variable server can also act as a server-side data object. This allows shared variable servers to be composed that may use a set of other shared variable servers as data objects. Embodiments of the invoke interface and each of the objects are described below; however, other embodiments are possible.

Invoke Interface.

The invoke interface includes a single method that can be used for invoking any operation on the shared data structure. This interface is internal, but is central to the composability of the objects, and allows efficient invocation of operations on user-defined shared nested data structures. The interface method takes the following form, in one example:

void invoke(int methodIndex, Buffer inParams, Buffer outParams)

In the above example, the method index refers to the operations to be performed on the shared variable; inParams refers to the input parameters for that operation; and outParams refers to the output/result of carrying out that operation; both inParams and outParams are optional.

Data Object.

The data object comes in two varieties—one for the server-side and the other for the stub-side. The server-side data object encapsulates the data structure that the user wants to share and implements the invoke interface for allowing the invocation of operations on the shared data structure. A server-side data object reference stub is also defined, which is a remote interface to the server-side data object. The server-side data object translates an invoke call to actual operations on the shared data-structure, while the reference stub forwards the invoke call to a remote server-side data object. Both, the server-side data object and the data object reference stub, also expose a set of three helper methods for the protocol object. These include (1) getInvocationScope method, which is used by the protocol object to determine whether an invoke call identified by methodIndex should be invoked on all data objects participating in the protocol, or should be invoked on only one such data object; (2) splitParams method, which is applied to inParams when an invoke call is determined to be an invoke-on-all call; it returns the inParams to be forwarded with the resulting invoke calls; and (3) mergeParams method, which is applied to outParams returned by each individual invoke call, after an incoming invoke call is determined to be an invoke-on-all call. Since the shared variable server also implements the invoke interface, when it is used with the server-side data object reference, it can be treated like a server-side data object.

The stub-side data object exposes the interface that is visible to either an operator that makes use of the shared variable or an external application. It is the same interface that a user would use when accessing a regular SPL data type. The stub-side data object translates the shared variable data access to an invoke call on the stub-side protocol object.

Consistency Protocol Object.

The protocol objects at the server-side and the stub-side together implement a specific mechanism for calling the invoke method on the participant, which in this case are the server-side data objects or the server-side data object reference stubs.

The server-side protocol objects expose the invoke interface to the server-side transport object. The protocol object accepts an invoke call and determines how and to which of the participating server-side data objects or data object reference stub the call should be forwarded to. For example, on receiving an invoke call, the consistency protocol object uses the methodIndex and the server-side data object's or the data object reference stub's getInvocationScope method to determine if the invoke method should be invoked on all the participating data objects, or should be invoked on only one of the participating data objects. For instance, consider an example where an integer shared variable is replicated three times for fault-tolerance, and the replicas are to be atomically updated. In this case, an invoke method is to be invoked on all the replicas, then the protocol object makes use of the splitParams and mergeParams methods provided by the data object to split the input parameters for invoke calls, and merge the return values from the invoke calls, respectively. The splitParams and mergeParams are typically useful when using, for instance, a shared variable whose type is a list, which due to its large size, might be partitioned across multiple nodes—a single logical shared variable server, which is physically distributed across multiple nodes.

The stub-side protocol object is a component that is used occasionally. In certain cases, having a stub-side protocol object can optimize the performance of the shared variable. The stub-side protocol exposes the same invoke interface to the stub-side data object, maintains information about the server-side data object, and uses the invoke method exposed by the stub-side transport object.

The consistency protocol objects include certain members and/or properties that are to be initialized at deployment time. These members include the references for any participating remote objects, and protocol specific initialization. This initialization is carried out by the shared variable manager by remotely invoking (using, e.g., CORBA) methods on the newly created protocol object.

Transport Object.

The transport object serves the purpose of hiding and encapsulating the details of a transport mechanism used for propagating the invoke call from the stub to the server. The transport objects provide the capability to adopt and use possibly any mechanism that can invoke operations on a remote object, as long as the implementation conforms to the invoke interface specification.

The server-side transport object implements an additional interface method that is used by the manager to retrieve a stringified reference to the transport object. This reference is used by the stub-side transport object to establish a connection with the server-side transport object.

The stub-side transport object exposes a connect method which accepts a stringified reference and establishes connection with the server-side. This method is used by the stub-side data object and by the server-side data object reference stubs.

Cache Mechanism Object.

The cache mechanism object is a component that can exist alongside the stub-side data object. If present, it intercepts the invoke call and returns the value for the shared variable contained in the cache. The cache content can be updated using a pull- or a push-based method. For the pull-based method, the implemented cache object supports fetching of data from a shared variable server using a time- or count-based policy. When using the time-based policy, for example, the cache content is updated every t time units. For a count-based policy, the cache is updated after every n number of invocations of the invoke method. For the push-based method, the cache object exposes a remotely accessible update interface, which is used by the shared variable server to push the updates.

Using the above objects and/or interface, the code generator creates the customized code for the shared variable servers, the shared variable stubs (i.e., client stubs) and the Shared Variable Description Language specification, each of which is further described below.

Shared Variable Server.

The shared variable server includes, for instance, a server-side transport object, a server-side consistency protocol object and may contain a server-side data object or a set of server-side data object reference stubs or both. An architectural feature of the shared variable server is the fact that it can also be a server-side data object. This feature allows for the composition capabilities, where a shared variable server can refer to multiple underlying shared variable servers (possibly at remote locations). The composability provided by the shared variable server plays a role in achieving scalability and fault-tolerance for managing the shared variables.

It is possible that a shared variable server may not contain any server-side data object, but instead contain references to other shared variable servers. This happens when multiple protocols are composed together. For instance, to achieve scalability one may represent a shared variable using a pair of causally related shared variable servers, where each causally shared variable server may itself be an atomically related master-slave pair for fault-tolerance purposes. To realize this scenario, two shared variable servers are created, and the one which is used to instantiate the causal pair does not contain any server-side data object, but instead contains a reference to the master shared variable server from the master-slave pair.

The server is responsible for storing the shared state and carrying out operations on the shared variable. In other words, in one example, the server allocates space for the variable and implements the operations that can be performed on that variable. Then, in response to receiving an invocation from a client that indicates the operation to be performed, the server decodes the information in the invocation and performs the specified operation.

The following C++ template specification may be used to generate a custom shared variable server:

ServerSideTransport<ServerSideProtocol<ServerSide Object>>

For instance,

CorbaServerTransport<AtomicProtocolServerSide <SharedIntegerServer>>

Each instantiated template represents a shared variable server, and one or multiple such servers could be combined together using an SVDL specification representing a shared variable.

Shared Variable Stub.

The shared variable stub (a.k.a., client-side stub) is the component that is used by the InfoSphere Streams™ entities, like operators and external applications, to gain access to the shared variable. The shared variable stub includes, for instance, a stub-side data object and a stub-side transport object. It may also include, in some examples, a stub-side protocol object, a set of server-side object reference stubs, and/or a cache object. The following C++ template specification may be used to generate a custom shared variable stub:

ClientSideStub<ClientSideProtocl<ClientSideTransport>>

For instance,

SharedIntegerClient<AtomicProtoclClientSide<Corba ClientTransport>>

Each instantiated template represents a shared variable stub, and could be used by a stream processing operator to access shared state.

Shared Variable Description Language.

The Shared Variable Description Language (SVDL) is, for instance, an XML-based representation that is used for specifying the composition of a single shared variable in terms of shared variable servers. SVDL can be used to fine-tune the performance, scalability and fault-tolerance attributes associated with a shared variable. For instance, using appropriately specified configurations in the SVDL XML excerpt, the number of replicas of a shared variable server that will be deployed to achieve a desired level of fault-tolerance is fine-tuned.

Returning to compiler 504 in FIG. 5, in addition to creating the shared variable configuration model, the SPL compiler produces artifacts and processing elements 520 used to host operators that use the shared variable. The processing element is the smallest building block and within the processing element there may be one or more operators. The SPL compiler also produces an Application Description Language file (ADL) 522, which is a file that has a structure representation of the application. It includes a description of the application, including the shared variables (which are described as SVDL excerpts) that the application might be defining and using.

At runtime, when an SPL application is submitted for execution, the ADL file describing that SPL application is input to the InfoSphere Streams™ job management component 524 and is used along with the embedded SVDL excerpts (note that in one embodiment, the SVDL is embedded in the ADL, but other embodiments are possible) to configure one or more shared variable manager 526. A shared variable manager is capable of accepting an SVDL specification for deployment of a shared variable. Once a shared variable has been deployed, the responsibility of maintaining a reference to the deployed shared variable is assigned to a shared variable manager. The shared variable servers run in the context of these shared variable managers. InfoSphereStreams™ provides the capability to monitor and restart these managers to ensure their availability even in the presence of failures.

As examples, a shared variable manager provides a facility to load shared variables (e.g., void loadSharedVariableUsingSVDLFile (string file, vector <string> refs); look-up shared variable references (e.g., void getSharedVariableReferences (const string& name, vector <string> refs); and provide a facility to unload shared variables (e.g., void unloadSharedVariableUsingName (const string& name)).

Described in detail herein is a technique to implement and use shared state in a stream processing environment, including a distributed stream processing environment. In one example, the shared state is represented by a shared variable implemented as a shared data structure. In accordance with one or more aspects of the present invention, different consistency models can be supported for different variables. State sharing is accomplished without the need for special hardware and without sacrificing performance and latency expectations.

Highly customizable and efficient sharing of state between operators and between an operator and the components of a stream processing system is provided. Customizations are allowed on a per shared state basis, and are available as language level configurations for specifying the user preferences and/or the usage hints. Efficiency is achieved by making use of runtime profiling and code generation to generate code that is best suited for the specified user preferences and/or the usage hints.

To achieve efficiency in state sharing in distributed stream applications, the code is custom generated for each shared variable at compile time. The customization performed during code generation, in turn, is driven by the user preferences and/or usage hints that are specified at the language level. By making use of compile-time code generation, the need for interpreted customizations is eliminated, and is therefore, able to achieve better efficiency.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
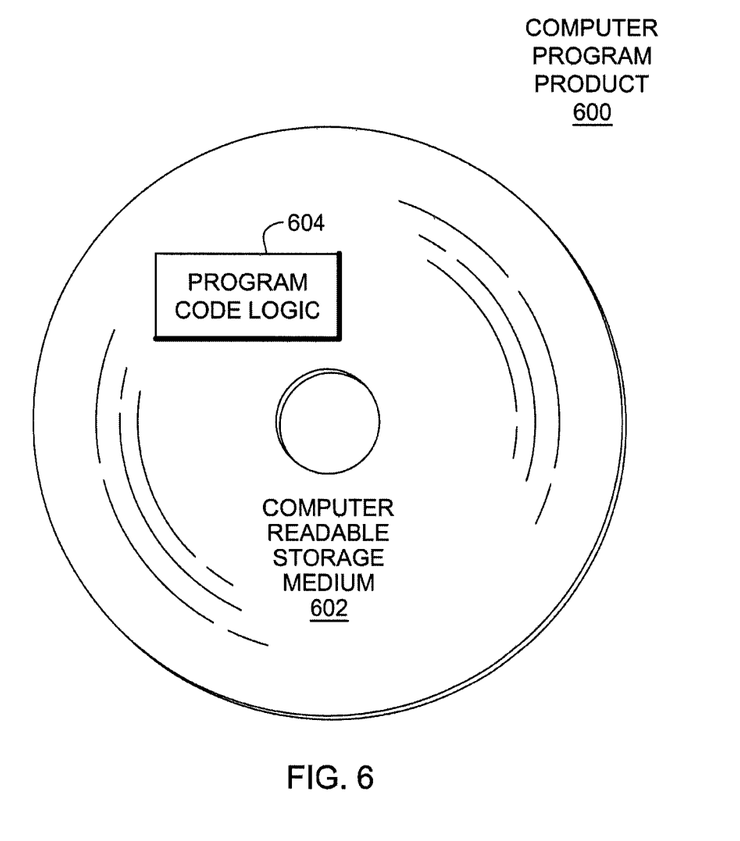
FIG. 6 depicts one embodiment of a computer program product incorporating one or more aspects of the present invention.

Referring to FIG. 6, in one example, a computer program product 600 includes, for instance, one or more computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, the data structure can be other than described above, and the shared state can be structures other than variables. Moreover, other languages may be used to create the applications. Also different stages of creation and deployment may be used. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of sharing data in a stream processing environment, said method comprising:
    obtaining, by a processor of the stream processing environment, at least one of usage information for shared data of the stream processing environment, one or more pre-declared characteristics of the shared data, or performance information relating to the stream processing environment; and
    generating, by the processor based on at least one of the usage information, the one or more pre-declared characteristics or the performance information, code for managing the shared data.

2. The method of claim 1, wherein the shared data is shared by at least one of a plurality of operators of one or more stream processing applications executing in the stream processing environment, a plurality of external applications, or one or more operators and one or more external applications.

3. The method of claim 1, wherein the generating code includes generating at least one of a server to encapsulate the shared data, a file to indicate a location and initialization information for the server, and a client stub to facilitate interaction with the shared data.

4. The method of claim 1, wherein the generating is customized in that an option is selectable for at least one of a caching mechanism, a consistency protocol or a transport implementation for the shared data.

5. The method of claim 1, wherein the code includes a server and a deployment specification, and wherein the method further comprises instantiating a shared data structure representing the shared data, the instantiating comprising:
    obtaining by a shared variable manager running on a node of the stream processing environment the server and deployment specification;
    loading the server on a node of the stream processing environment; and
    initializing the loaded server with one or more parameters from the deployment specification.

6. The method of claim 5, wherein the shared data structure comprises a nested complex data structure.

7. The method of claim 1, wherein the shared data is represented as a shared data structure, and wherein the usage information comprises one or more usage hints, said one or more usage hints comprising at least one of expected number of read operations per second, expected number of write operations per second, or expected size of the shared data structure.

8. The method of claim 1, wherein the usage information comprises one or more usage preferences, said one or more usage preferences including at least one of fault tolerance goals or consistency goals.

9. The method of claim 1, wherein the code is customized for a particular usage scenario.

10. The method of claim 1, further comprising determining, by a profiler, the performance information.

11. A system for sharing data in a stream processing environment, said system comprising:
    a processor of the stream processing environment to obtain at least one of usage information for shared data of the stream processing environment, one or more pre-declared characteristics of the shared data, or performance information relating to the stream processing environment; and
    the processor to generate, based on at least one of the usage information, the one or more pre-declared characteristics or the performance information, code for managing the shared data.

12. The system of claim 11, wherein the shared data is shared by at least one of a plurality of operators of one or more stream processing applications executing in the stream processing environment, a plurality of external applications, or one or more operators and one or more external applications.

13. The system of claim 11, wherein the processor to generate code includes generating at least one of a server to encapsulate the shared data, a file to indicate a location and initialization information for the server, and a client stub to facilitate interaction with the shared data.

14. The system of claim 11, wherein the code includes a server and a deployment specification, and wherein the system further comprises one or more processors to instantiate a shared data structure representing the shared data, the instantiating comprising:
    obtaining by a shared variable manager running on a node of the stream processing environment the server and deployment specification;
    loading the server on a node of the stream processing environment; and
    initializing the loaded server with one or more parameters from the deployment specification.

15. The system of claim 11, wherein the shared data is represented as a shared data structure, and wherein the usage information comprises one or more usage hints, said one or more usage hints comprising at least one of expected number of read operations per second, expected number of write operations per second, or expected size of the shared data structure.

16. A computer program product for sharing data in a stream processing environment, said computer program product comprising:
    a computer readable storage medium readable by a processor and storing instructions for execution by the processor for performing a method comprising:
        obtaining at least one of usage information for shared data of the stream processing environment, one or more pre-declared characteristics of the shared data, or performance information relating to the stream processing environment; and
        generating, based on at least one of the usage information, the one or more pre-declared characteristics or the performance information, code for managing the shared data.

17. The computer program product of claim 16, wherein the shared data is shared by at least one of a plurality of operators of one or more stream processing applications executing in the stream processing environment, a plurality of external applications, or one or more operators and one or more external applications.

18. The computer program product of claim 16, wherein the generating code includes generating at least one of a server to encapsulate the shared data, a file to indicate a location and initialization information for the server, and a client stub to facilitate interaction with the shared data.

19. The computer program product of claim 16, wherein the code includes a server and a deployment specification, and wherein the method further comprises instantiating a shared data structure representing the shared data, the instantiating comprising:
  obtaining by a shared variable manager running on a node of the stream processing environment the server and deployment specification;
  loading the server on a node of the stream processing environment; and
  initializing the loaded server with one or more parameters from the deployment specification.

20. The computer program product of claim 16, wherein the shared data is represented as a shared data structure, and wherein the usage information comprises one or more usage hints, said one or more usage hints comprising at least one of expected number of read operations per second, expected number of write operations per second, or expected size of the shared data structure.

* * * * *